United States Patent [19]
Chavez

[11] Patent Number: 5,822,080
[45] Date of Patent: Oct. 13, 1998

[54] DESKTOP SPACE-SAVER SCANNER

[75] Inventor: Martha A. Chavez, Greeley, Colo.

[73] Assignee: Hewlett-Packard Company, Palo Alto, Calif.

[21] Appl. No.: 708,384

[22] Filed: Sep. 4, 1996

[51] Int. Cl.⁶ .............. H04N 1/04; G09G 5/08; H03K 17/94
[52] U.S. Cl. .......... 358/374; 358/494; 358/496; 358/498; 345/167; 345/168; 341/20
[58] Field of Search .................. 358/473, 474, 358/496, 498, 494; 345/167, 168; 341/20; 364/708.1, 709.01, 709.11, 709.12

[56] References Cited

U.S. PATENT DOCUMENTS

| | | | |
|---|---|---|---|
| 5,049,863 | 9/1991 | Oka | 340/710 |
| 5,250,930 | 10/1993 | Yoshida et al. | 345/168 |
| 5,438,331 | 8/1995 | Gilligan et al. | 341/20 |
| 5,477,238 | 12/1995 | Aharanson et al. | 358/474 |
| 5,499,108 | 3/1996 | Cotte et al. | 358/400 |
| 5,519,570 | 5/1996 | Chung | 345/168 |
| 5,623,285 | 4/1997 | Aharonson et al. | 358/474 |

*Primary Examiner*—Edward L. Coles
*Assistant Examiner*—Mark Wallerson
*Attorney, Agent, or Firm*—Cynthia S. Baan

[57] ABSTRACT

A scanner is disclosed that may include a flatbed scanner with a scanner lid that has a keyboard of a desktop computer attached to the scanner lid in such a manner that the keyboard does not slide off the scanner lid when the scanner lid is lifted to scan bound documents, books or other 3D objects. The scanner of the present invention may also include a flatbed scanner that has the keyboard as an integral part of the scanner lid such that the keyboard/scanner lid is lifted when bound documents, books or other 3D objects are to be scanned. The scanner of the present invention may also include an automatic document feeder that can be attached to one of the sides of the scanner in such a manner that it would not interfere with the keyboard and mouse operations. The scanner of the present invention may also include a wrist pad and a mouse that are integral with the scanner lid.

2 Claims, 5 Drawing Sheets

DESKTOP SPACE-SAVER SCANNER

FIELD OF THE INVENTION

The present invention relates generally to the field of desktop scanners and more particularly to a space saving desktop flatbed scanner.

BACKGROUND OF THE INVENTION

A scanner is a device which converts a visible image such as a photograph, transparency or printed paper into an electronic form suitable for copying, storing or processing by a computer. As technology evolves, there are more and more peripherals such as scanners that computers support. This improves the work efficiency of office workers, students, telecommuters, etc. Yet, the desktop is becoming so crowded that it is becoming difficult to find space to work.

Scanner manufacturers have responded to this by decreasing the size of sheet feeding scanners. However, sheet feed scanners do not offer the flexibility of flatbed scanners. That is, sheet feed scanners are not capable of scanning bound documents, books, or 3D objects. Also, sheet feed scanners do not provide preview scanning. Flatbed scanners are capable of performing all of these tasks. Unfortunately, current flatbed scanners take up a great deal of valuable desktop space. Accordingly, there is a need in the field of scanners for a space saving, desktop flatbed scanner.

SUMMARY OF THE INVENTION

The short comings of current scanners is overcome by the scanner of the present invention, and are accomplished in a scanner that leverages the desktop real estate currently utilized by the keyboard, while at the same time providing the scanning flexibility of a flatbed scanner. The flatbed scanner of the present invention may include a flatbed scanner that has the keyboard of the desktop computer attached to the scanner lid in such a manner that the keyboard does not slide off the scanner lid when the scanner lid is lifted to scan bound documents, books or other 3D objects. The flatbed scanner of the present invention may also include a flatbed scanner that has the keyboard as an integral part of the scanner lid such that the keyboard/scanner lid is lifted when bound documents, books or other 3D objects are to be scanned. The flatbed scanner of the present invention may also include an automatic document feeder that can be optionally attached to one of the sides of the scanner or build in to the scanner in such a manner that it would not interfere with the keyboard and mouse operations.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
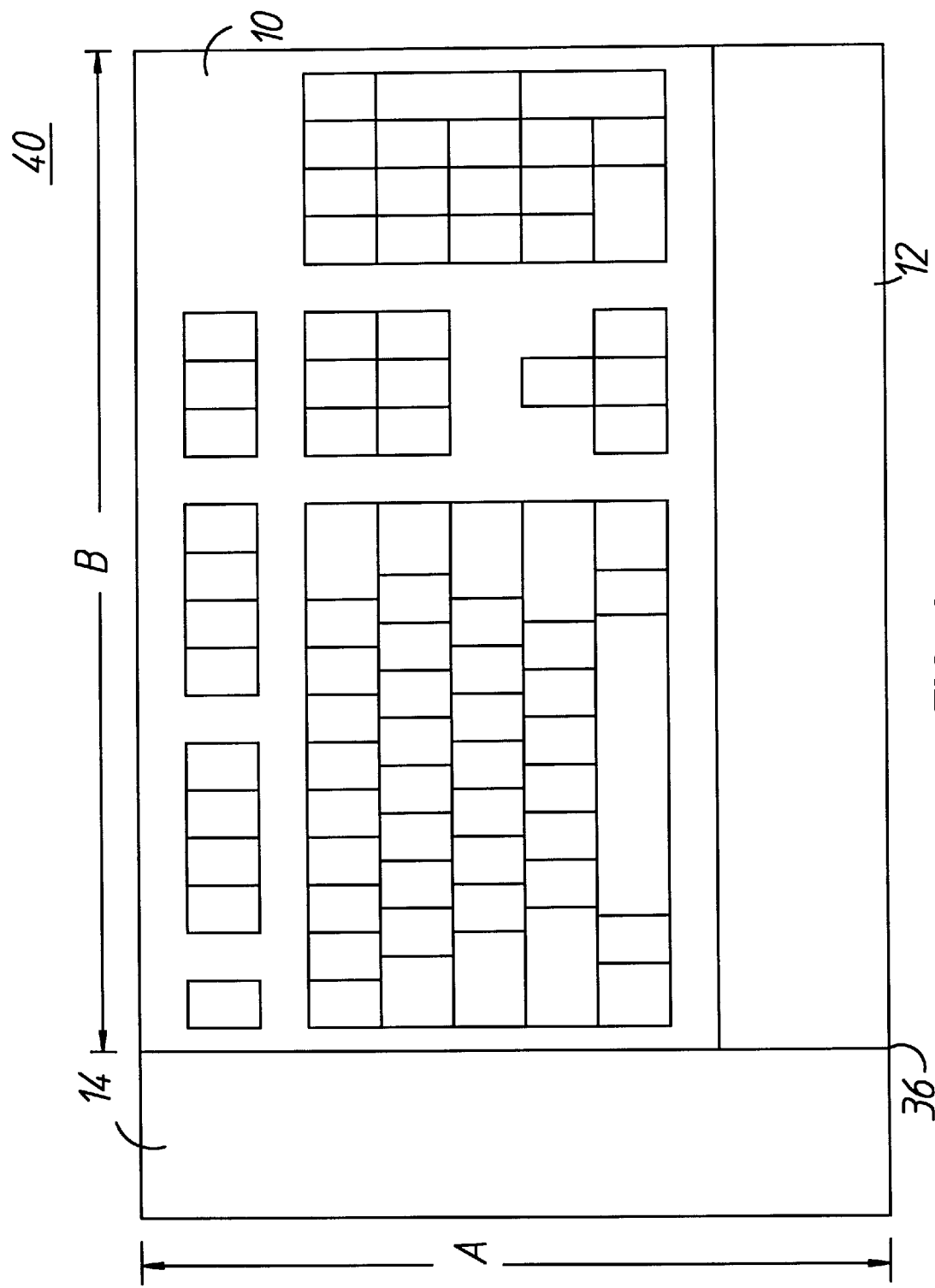
FIG. 1 shows a top view of a space saving scanner according to a first embodiment of the present invention.

Referring to FIG. 1, a desktop scanner 40 is shown according to a first embodiment of the present invention. The operation of a scanner is well known and will not be taught herein. However, the operation of a scanner is disclosed in U.S. patent application Ser. No. 08/436,046 entitled "Automatic Document Presence, Width and Skew Detection Method and Apparatus for a Document Scanner" by Ronald Kerschner, filed May 5, 1995 and in U.S. patent application Ser. No. 08/594,192 entitled "Method and Apparatus for Dynamic White Point Adjustment" by Edward Beeman et al., filed Jan. 31, 1996, which are incorporated herein for all that they teach.

The rectangle comprised of width "A" and length "B" makes up the scanner lid, where the rectangle comprised of width "A" and length "B" is at least large enough to completely scan a document of 8.5 inches by 11 inches (standard size) or 11 inches by 14 inches (legal size). A computer key board 10 and a wrist pad 12 sit on top of and are attached to the scanner lid (element 26 in FIG. 4). Computer key board 10 and wrist pad 12 may be secured to the scanner lid 26 by means of glue, "Velcro", clips, screws, or any other attachment means that will keep the computer key board 10 and the wrist pad 12 from sliding off of the scanner lid when the scanner lid 26 is lifted to scan documents or other objects. The computer keyboard 10 and wrist pad 12 may also be secured to the scanner lid 26 by means of snapping onto the scanner lid 26 design detail (not shown). The scanner lid 26 is hinged at 36.

Alternatively, the computer key board 10 and/or the wrist pad 12 may be integral with the scanner lid. A solution where the computer key board 10 and/or the wrist pad 12 are integral with the scanner lid saves components and space, making for an even lower profile solution to the desktop space problem. Another option to the first embodiment is to attach an automatic document feeder 14 to one side of the scanner body (element 28 in FIGS. 4 and 5). Attaching an automatic document feeder 14 to one side of the scanner 28 permits automatic sheet scanning and would not interfere with keyboard or mouse operations. The automatic document feeder 14 may be built into the scanner or an optional add on.

Figure 2:
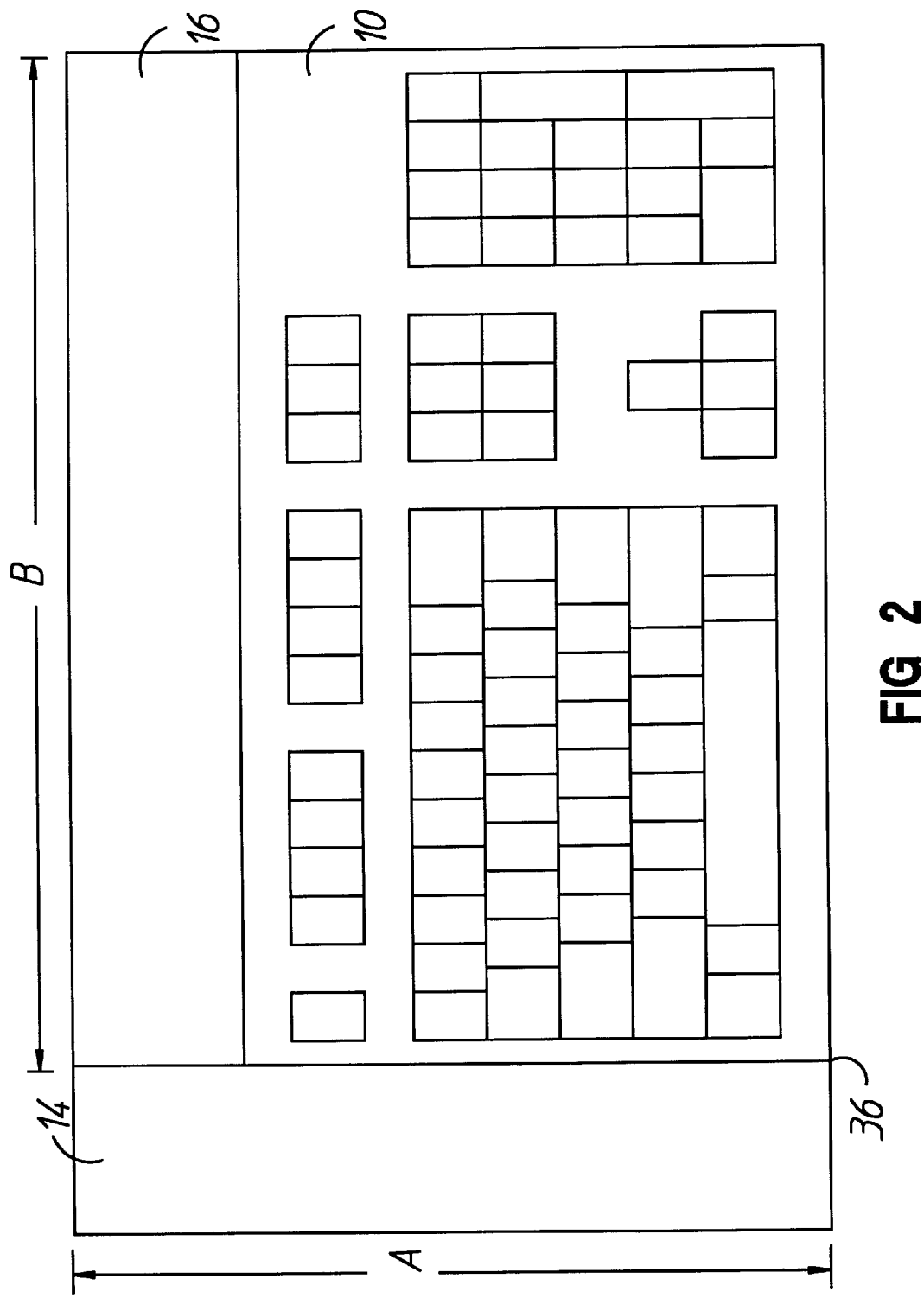
FIG. 2 shows a top view of a space saving scanner according to a second embodiment of the present invention.

FIG. 2 shows a top view of a space saving scanner according to a second embodiment of the present invention. In the second embodiment, the computer keyboard 10 is secured to the scanner lid 26 with the overlap 16 of the scanner lid 26 being behind the computer keyboard and out of the user's way. The keyboard 10 of the second embodiment may be secured to the scanner lid 26 by any means, such as glue, "Velcro", screws, clips, etc., in order to prevent the keyboard from sliding off of the scanner lid 26 when the scanner lid 26 is lifted along hinge 36 to scan a document or other object. The computer keyboard 10 and wrist pad 12 may also be secured to the scanner lid 26 by means of snapping on to the scanner lid design detail. An automatic document feeder 14 may also be added to one side of the scanner body (element 28 in FIGS. 4 and 5) in order to facilitate single sheet scanning without interfering with the keyboard or mouse operations. The width "A" should at least be long enough to accommodate the scanning of 8.5 inches for standard size documents (or 11 inches for legal size documents) and the length "B" should be at least long enough to accommodate the scanning of 11 inches for standard size documents (or 14 inches for legal size documents).

Figure 4:
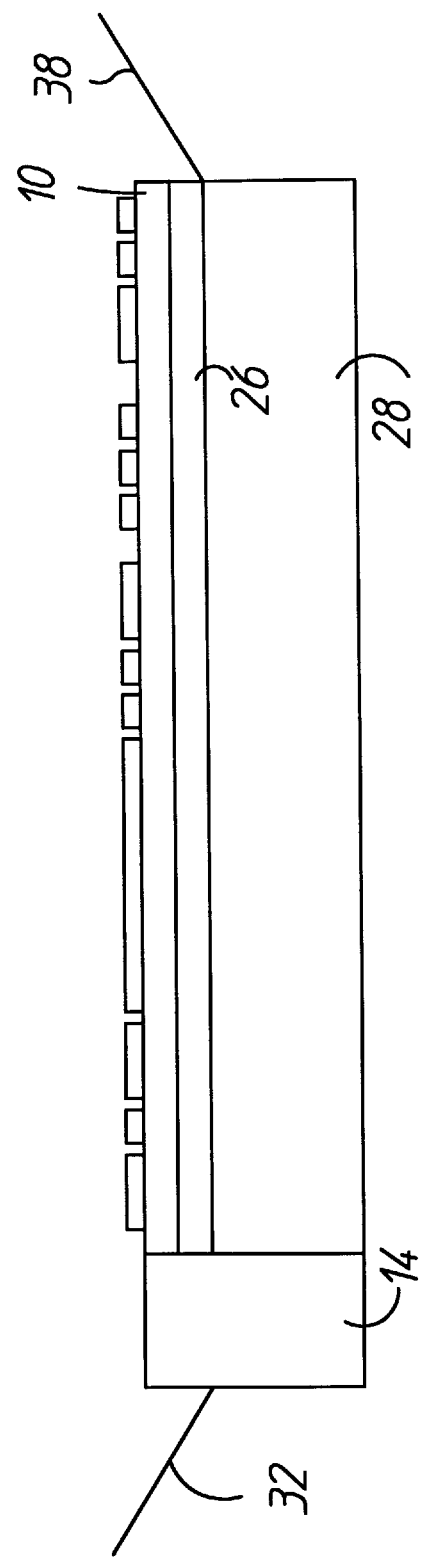
FIG. 4 shows a side view of a space saving scanner according to a first option for either of the first, second or third embodiments of the present invention.
Figure 5:
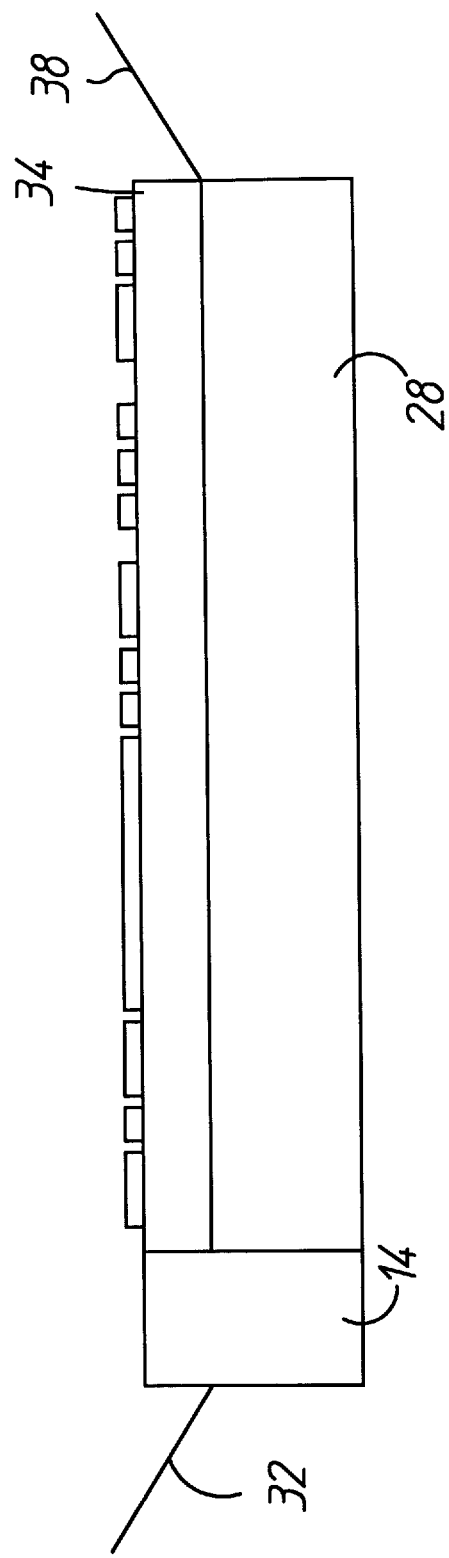
FIG. 5 shows a side view of a space saving scanner according to a second option for either of the first, second or third embodiments of the present invention.

FIGS. 4 and 5 show side views of the space saving scanner of the present invention. In FIG. 4 is shown a scanner body 28 with a scanner lid 26 and an optional automatic document feeder 14. In FIG. 4, the computer keyboard 10 is secured to the top of the scanner lid 26 by any means, such as glue, epoxy, clips, screws, "Velcro", or by snapping onto the scanner lid design detail, etc.

Also shown in FIG. 4 are optional input tray 32 and output tray 38. Input tray 32 may be internal to automatic document feeder 14 and pulled out and secured in place when needed to hold sheets to be fed into the automatic document feeder 14 when the automatic document scan operation is being performed. Alternatively, input tray 32 may also be integral with automatic document feeder 14 or separate from automatic document feeder 14 and secured thereto as needed for the automatic document scan process.

Output tray 38 may be internal to scanner 28 and pulled out and secured in place when needed to catch the sheets being scanned during the automatic document sheet feed scan process as they exit the scanner 28. Alternatively, output tray 38 may also be integral with the scanner 28 or separate from the scanner 28 and secured thereto as needed for the automatic document sheet feed scan process.

In FIG. 5, the computer keyboard and the scanner lid are one integral unit 34. The major difference between the scanner of FIGS. 4 and 5 being that in FIG. 5 the keyboard/scanner lid unit uses fewer components and has a lower profile than the scanner of FIG. 4 with a keyboard attached to the scanner lid 26. There are pros and cons to both embodiments. With an attached keyboard of FIG. 4, the keyboard, wrist pad and mouse may be attached wherever the end user decides to attach them, thus, accommodating both left and right hand users. Also, with the attached keyboard, if the keyboard needs to be repaired or replaced, it would be a simpler and cheaper proposition than repairing or replacing the integral keyboard 34 of FIG. 5. However, the integral keyboard of FIG. 5 permits a lower overall scanner profile and fewer components. Accordingly, the scanner of FIG. 5 could be cheaper to manufacture, lighter and smaller.

Figure 3:
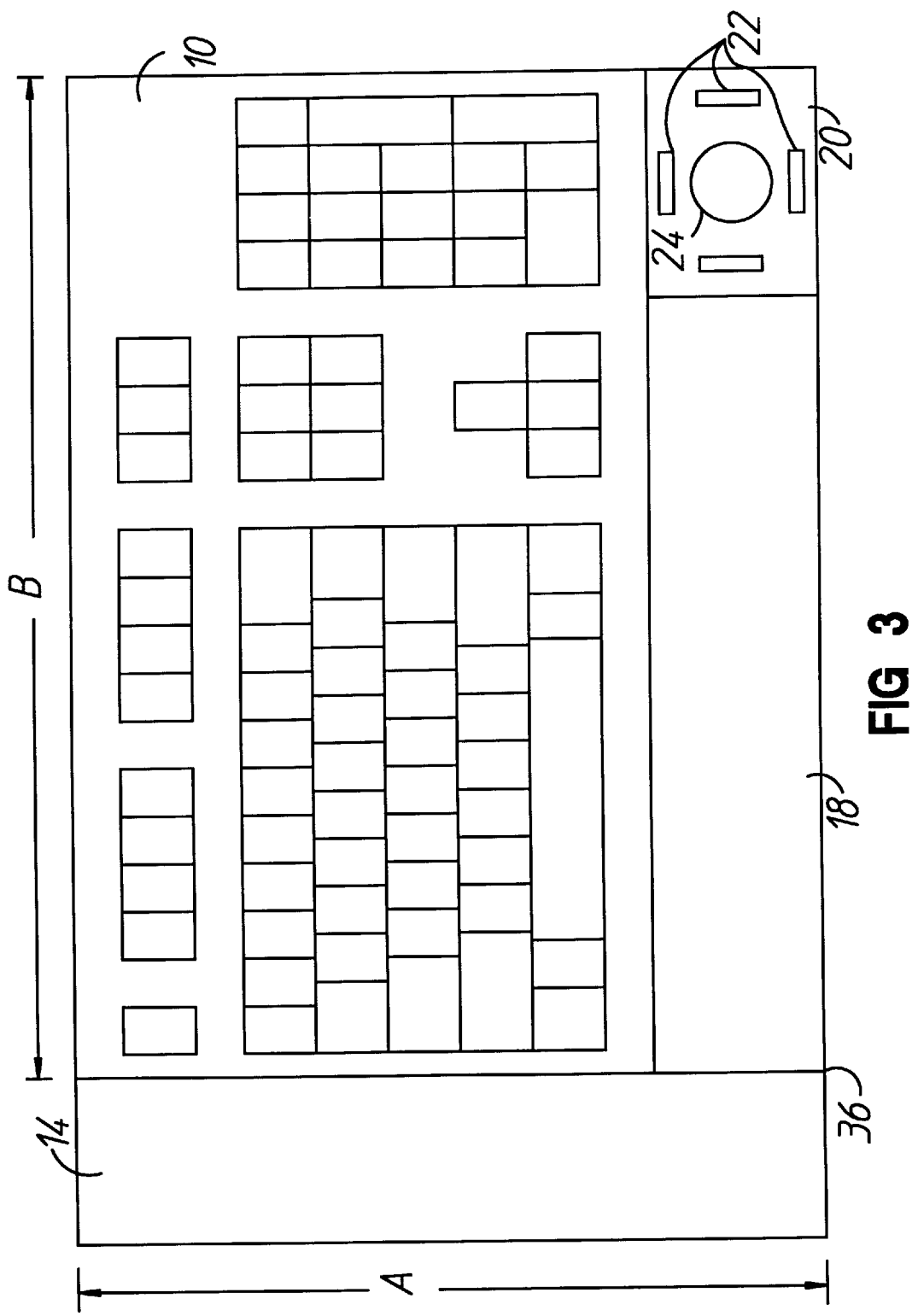
FIG. 3 shows a top view of a space saving scanner according to a third embodiment of the present invention.

FIG. 3 shows a top view of a space saving scanner according to the third embodiment of the present invention. The rectangle comprised of width "A" and length "B" makes up the scanner lid, where the rectangle comprised of width "A" and length "B" is at least large enough to completely scan a document of 8.5 inches by 11 inches for standard size documents (or 11 inches by 14 inches for legal size documents). A computer key board 10, a wrist pad 18, and a mouse 20 sit on top of and are attached to the scanner lid (element 26 in FIG. 4). Mouse 20 may the type of mouse that is commonly found on laptop computer (i.e., a cursor position ball 24 and input buttons 22).

Computer key board 10, wrist pad 18, and mouse 20 may be secured to the scanner lid 26 by means of glue, "Velcro", clips, screws, or any other attachment means that will keep the computer key board 10, the wrist pad 18, and the mouse 20 from sliding off of the scanner lid when the scanner lid 26 is lifted to scan documents or other objects. The scanner lid 26 is hinged at 36.

Alternatively, the computer key board 10, the wrist pad 18, and/or the mouse 20 may be integral with the scanner lid. A solution where the computer key board 10, the wrist pad 18, and/or the mouse 20 are integral with the scanner lid saves components and space, making for an even lower profile, smaller footprint solution to the desktop space problem. Another option to the third embodiment is to attach an automatic document feeder 14 to one side of the scanner (element 28 in FIGS. 4 and 5). Attaching an automatic document feeder 14 to one side of the scanner 28 permits automatic sheet scanning and would not interfere with keyboard or mouse operations.

For the overall lowest profile, smallest footprint solution to the computer desktop space problem, a scanner 28 that includes a keyboard 10, a wrist pad 18, and a mouse 20 that are integral with the scanner lid 26 and an automatic document feeder 14 that is attached to one side of the scanner 28 would be the preferred embodiment. Such a solution would combine the space that a scanner, a computer keyboard and a mouse would normally take up and reduce it down to the space of a scanner. Also, if the keyboard 10, wrist pad 18, and mouse 20 is integral with the scanner lid 26 as shown in FIGS. 3 and 5, the input 32, and output 38 would have the least amount of interference with the keyboard and mouse operations.

It should be noted that the computer keyboard and mouse may be connected to the computer (not shown) in any known manner (i.e., computer cables, infrared, etc.). Alternatively, if the keyboard 10 and the mouse 20 are integral with the scanner lid 26, then the scanner 28, the keyboard 10 and the mouse 20 may all be connected to the computer (not shown) via a single connection means in order to further save desktop space and cable clutter.

Finally, it should be noted that all of the Figures, but especially FIG. 3 would accommodate a right handed user. However, it would be an obvious expedient to accommodate a left handed user by either moving the mouse 20 to the middle or the left of the keyboard 10.

The foregoing description of the present invention has been presented for purposes of illustration and description. It is not intended to be exhaustive or to limit the invention to the precise form disclosed, and other modifications and variations may be possible in light of the above teachings. For example, the automatic document feeder 14 could be attached to the front or back of the scanner 28, rather than to the side. Also, the output tray 38 could be located on the same side as the automatic document feeder 14 and the input tray 32. Also, the scanner lid 26 could be hinged at the front or the back rather than at the side 36. Still further, there are many methods of attaching the keyboard 10, wrist pad 12, and mouse 20 that may not have been listed (i.e., screws, nuts, bolts, rivets, "Velcro", glue, epoxy, snaps, clips, clamps, etc.). The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A space saving scanner, said space saving scanner comprising:
   a scanner body;
   a scanner lid attached to said scanner body;
   a computer keyboard removably attached to a top surface of said scanner lid in such a manner that when said scanner lid is lifted, said computer keyboard does not slide or fall off of said scanner lid;

a computer mouse removably attached to said top surface of said scanner lid in such a manner that when said scanner lid is lifted, said computer mouse does not slide or fall off of said scanner lid; and an automatic document feeder removably attached to a side of said scanner body in such a manner that said automatic document feeder does not interfere with computer keyboard or mouse operations, wherein when a document is being scanned, it travels along the length of the keyboard rather than along the width.

2. A space saving scanner, said space saving scanner comprising:

a scanner body;

a scanner lid attached to said scanner body;

a computer keyboard integral with a top surface of said scanner lid in such a manner that when said scanner lid is lifted, said computer keyboard does not slide or fall off of said scanner lid, the integral combination said scanner lid and said computer keyboard being lower in profile than a keyboard sitting on top of a scanner lid;

a computer mouse integral with said top surface of said scanner lid in such a manner that when said scanner lid is lifted, said computer mouse does not slide or fall off of said scanner lid; and an automatic document feeder attached to a side of said scanner body in such a manner that said automatic document feeder does not interfere with computer keyboard or mouse operations, wherein when a document is being scanned, it travels along the length of the keyboard rather than along the width.

* * * * *